(12) United States Patent
Masaki

(10) Patent No.: US 6,601,961 B1
(45) Date of Patent: Aug. 5, 2003

(54) LIGHT GUIDE PLATE AND PROCESS FOR PRODUCING THE SAME, SURFACE LIGHT SOURCE EQUIPMENT AND LIQUID CRYSTAL DISPLAY

(75) Inventor: Tadahiro Masaki, Shinjuku-Ku (JP)

(73) Assignee: Dai Nippon Printing Co., Ltd. (JP)

( * ) Notice: Subject to any disclaimer, the term of this patent is extended or adjusted under 35 U.S.C. 154(b) by 496 days.

(21) Appl. No.: 09/175,407

(22) Filed: Oct. 20, 1998

(30) Foreign Application Priority Data

Oct. 20, 1997 (JP) ............................................. 9-303342

(51) Int. Cl.⁷ .............................................. G01D 11/28
(52) U.S. Cl. ........................... 362/26; 362/31; 385/146; 385/901
(58) Field of Search .............................. 362/26, 27, 31; 385/146, 901

(56) References Cited

U.S. PATENT DOCUMENTS 5,714,218 A * 2/1998 Nishio et al. ............... 428/64.1
5,967,637 A * 10/1999 Ishikawa et al. ............... 362/31

* cited by examiner

Primary Examiner—Sandra O'Shea
Assistant Examiner—John Anthony Ward
(74) Attorney, Agent, or Firm—Parkhurst & Wendel, L.L.P.

(57) ABSTRACT

The present invention provides a light guide plate for use in the surface light source equipment of a liquid crystal display or the like, wherein the light guide plate is a molded product of an ionizing-radiation-curable resin, and its maximum thickness on the light-source-fixing part side is 1.0 mm or less.

Further, the present invention provides a process for producing a light guide plate, comprising the resin-coating step of forming a resin mass of an ionizing-radiation-curable resin at one end of the inside of a mold for shaping a light guide plate; the step of placing an ionizing-radiation-transmissive film on the resin mass of the ionizing-radiation-curable resin; the step of spreading the film on the ionizing-radiation-curable resin while filling the mold with the ionizing-radiation-curable resin through the film by the use of press rolls; the step of curing the ionizing-radiation-curable resin by applying thereto ionizing radiation; and the step of releasing the molded product of the ionizing-radiation-curable resin from the mold.

11 Claims, 4 Drawing Sheets

PRIOR ART
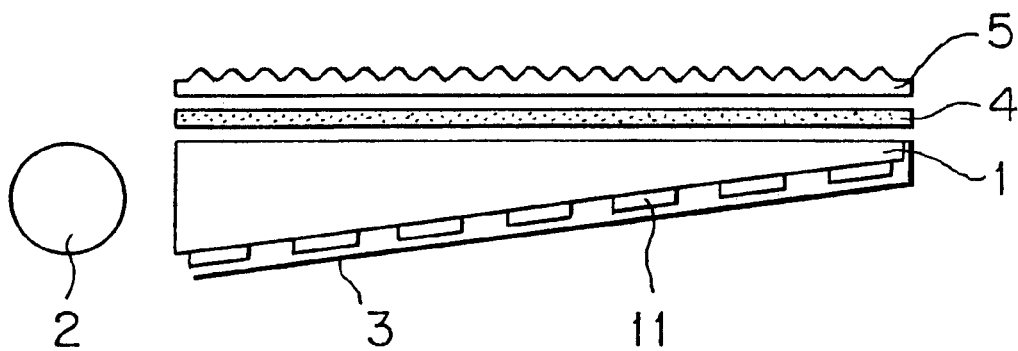
F I G. 5
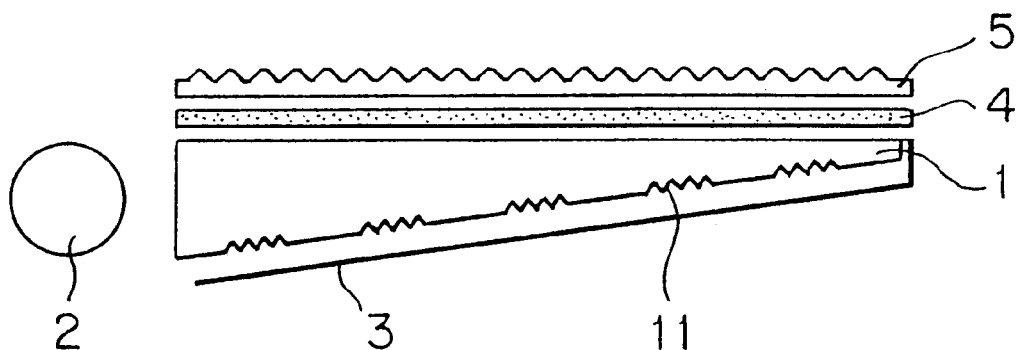
F I G. 6

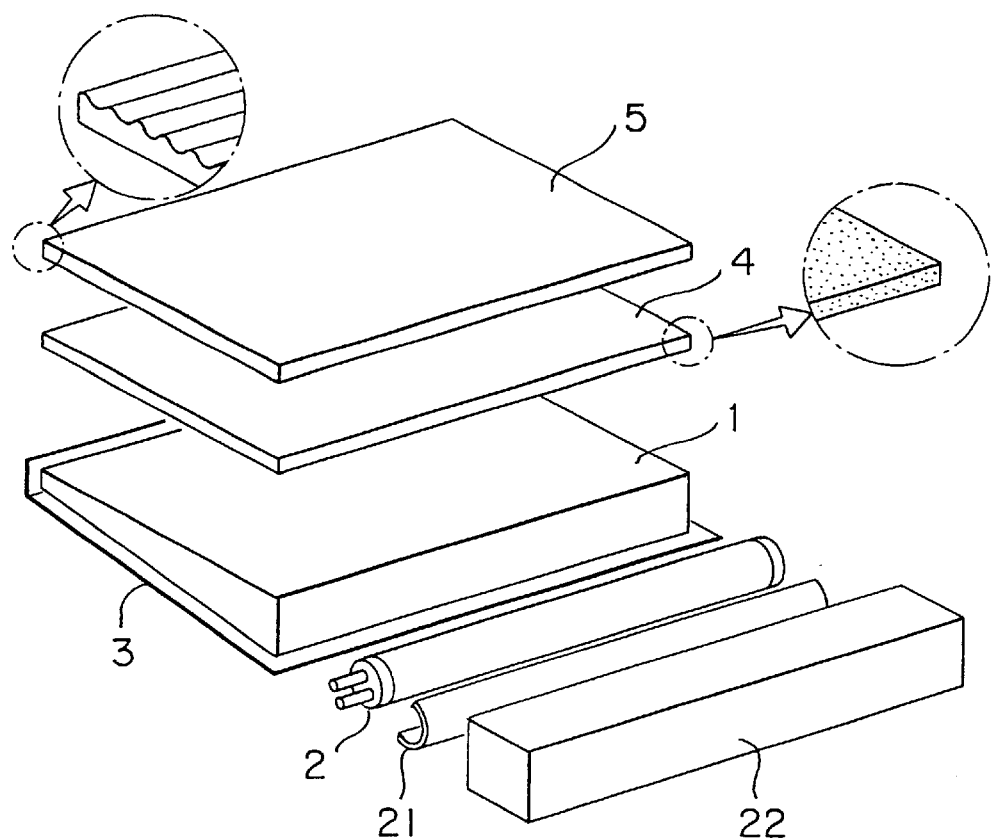
F I G. 7

LIGHT GUIDE PLATE AND PROCESS FOR PRODUCING THE SAME, SURFACE LIGHT SOURCE EQUIPMENT AND LIQUID CRYSTAL DISPLAY

BACKGROUND OF THE INVENTION

1. Technical Field

The present invention relates to light guide plates that are a component of edge-light-type surface light source equipment useful as the back lights of rear projection liquid crystal displays, sign boards, and the like; to a process for producing the same; and to surface light source equipment and liquid crystal displays that utilize the same. Particularly, an object of the present invention is to provide light guide plates having high efficiency for light utilization, with which back lights can be made thin, and surface light source equipment and light crystal displays that use such light guide plates.

2. Background Art

Conventional back lights for use in rear projection displays such as liquid crystal displays are classified into edge type and direct type, depending upon the position of their light sources. However, in the case of liquid crystal displays, mainly used are edge-light-type back lights with which thinner liquid crystal displays good for space savings can be obtained.

FIG. 5 is a cross-sectional view showing one example of an edge-type, single-light-type surface light source equipment.

As shown in FIG. 5, such a surface light source equipment is composed of a light guide plate 1, a linear light source 2, a light-reflecting film 3, a light-diffusing film 4, a lens film 5, and the like. For the linear light source 2, a cold cathode tube is used; and a metal-deposited resin film or the like is used for the light-reflecting film 3. Further, in order to correct that the quantity of emergent light from the light guide plate decreases as the distance from the light source becomes great, a light-emerging pattern 11 composed of white dots is formed, by means of printing, directly on the back surface of the light guide plate, or on the light-reflecting film 3 to be provided on the back surface of the light guide plate, in such a manner that the dots become dense as the distance from the light source becomes great. Since this light-emerging pattern is so formed that the density of the dots becomes high as the distance from the light source becomes great (on the right side in the figure), the quantity of emergent light at the side fare from the light source is prevented from becoming insufficient. The light-diffusing film 4 scatters emergent light from the light guide plate, and prevents the light source and the dots of the light-emerging pattern from being directly seen by light. In addition, this film broadens light to increase the viewing angle of a display. Further, for the lens film 5, a resin film on which a large number of, for example, triangular or semi-ellipsoidal prisms are two-dimensionally arranged, or the like is used.

In such a surface light source equipment, it is demanded to make the light guide plate thin in order to meet the need for thinner, light-weighted liquid crystal displays, etc.

There has been effected, as a method for producing conventional light guide plates, (1) a method in which an acrylic plate is cut and polished, or (2) a method using injection molding. However, the method (1) is complicated in production process, and desired shapes cannot be obtained by this method. Further, although the method (2) is advantageous in that desired shapes can freely be obtained, it is impossible to obtain, by this method, thin molded products with thicknesses of 1 mm or less due to the limit of the flowability of resins.

SUMMARY OF THE INVENTION

Accordingly, a primary object of the present invention is to provide a light guide plate whose maximum thickness is 1.0 mm or less, and a simple process for producing such a light guide plate.

Thus, the present invention provides a light guide plate for use in the surface light source equipment of a liquid crystal display or the like, wherein the light guide plate is a molded product of an ionizing-radiation-curable resin, and its maximum thickness on the light-source-fixing part side is 1.0 mm or less.

According to an embodiment of the present invention, a light-diffusive film is integrally formed on the above-described light guide plate on its light-emerging surface side.

According to another embodiment of the present invention, a lens film is integrally formed on the above-described light guide plate on its light-emerging surface side.

The present invention also provides a process for producing a light guide plate, comprising the resin-coating step of forming a resin mass of an ionizing-radiation-curable resin at one end of the inside of a mold for shaping a light guide plate; the step of placing an ionizing-radiation-transmissive film on the resin mass of the ionizing-radiation-curable resin; the step of spreading the film on the ionizing-radiation-curable resin while filling the mold with the ionizing-radiation-curable resin through the film by the use of press rolls; the step of curing the ionizing-radiation-curable resin by applying thereto ionizing radiation; and the step of releasing the molded product of the ionizing-radiation-curable resin from the mold.

In the above process, the ionizing-radiation-transmissive film may be a light-diffusive film, or a film in the shape of a lens.

Further, the above-described process may further comprise the step of separating the film from the molded product released.

According to the present invention, extremely thin light guide plates whose maximum thicknesses are 1.0 mm or less, such small thicknesses being unattainable by any of conventional processes, can accurately be formed in any shape as desired. By the use of such light guide plates, it is possible to obtain thin, light-weighted surface light source equipment and liquid crystal displays.

BRIEF DESCRIPTION OF THE DRAWINGS

In the drawings,

FIG. 5 is a cross-sectional view showing one example of an edge-type, single-light-type surface light source equipment;

FIG. 6 is a view showing one example of a surface light source equipment of the present invention; and FIG. 7 is a perspective view showing the disintegrated components of the surface light source equipment shown in FIG. 6.

DETAILED DESCRIPTION OF THE INVENTION

By referring to the accompanying drawings, embodiments of the present invention will be described hereinafter.

Figure 1:
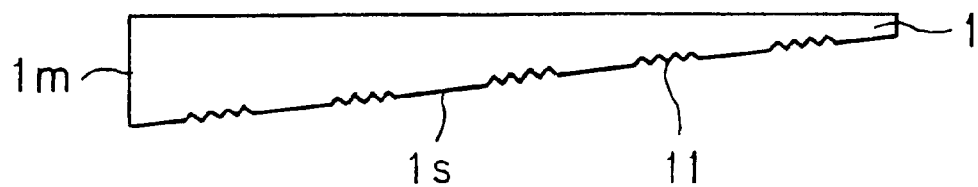
FIG. 1 is a view showing a first embodiment of a light guide plate of the present invention.
Figure 2:
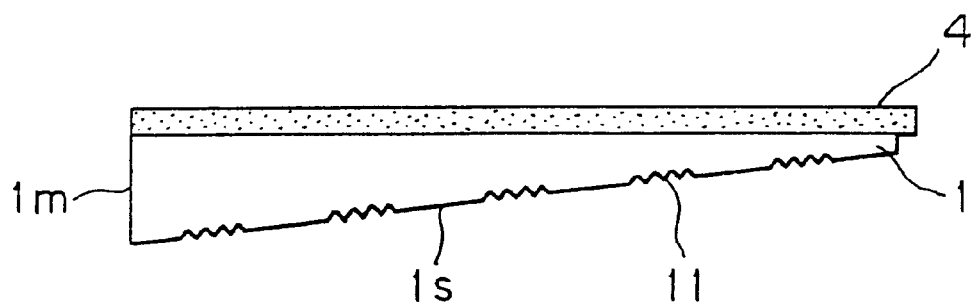
FIG. 2 is a view showing a second embodiment of a light guide plate of the present invention.

FIG. 1 is a view showing a first embodiment of a light guide plate of the present invention; FIG. 2 is a view showing a second embodiment of a light guide plate of the present invention; and FIG. 3 is a view showing a third embodiment of a light guide plate of the present invention.

In the embodiment shown in FIG. 1, a light guide plate 1 is composed of a single plate, and the size of a part 1m corresponding to the maximum thickness of this light guide plate is made 1.0 mm or less. When this light guide plate is used for a surface light source equipment, a linear light source is provided on the side surface 1m, the thick side of the light guide plate, whereby light flux from the light source is reflected at and emerges from the inclined part 1s of the light guide plate. A light-emerging pattern 11 for scattering light is preferably provided on the inclined part 1s. The light-emerging pattern can be reproduced by forming fine irregularities of approximately 1 to 20 μm on a metal mold for shaping the light guide plate. In the case of the embodiment shown in FIG. 1, the light guide plate is useful for single-light equipment, and in the shape of a wedge. However, in the case where linear light sources are provided on both sides, the light guide plate may be made into the shape of a plane. Such a light guide plate can be obtained by placing an ionizing-radiation-curable resin in a mold and curing the resin by the application of ionizing radiation as will be described hereinafter.

In a light guide plate 1 of the embodiment shown in FIG. 2, a light-diffusive film 4 is integrally formed on the light guide plate on its light-emerging-surface side. For the light-diffusive film 4, a film coated with a light-diffusive film, or the like may be used.

Figure 3:
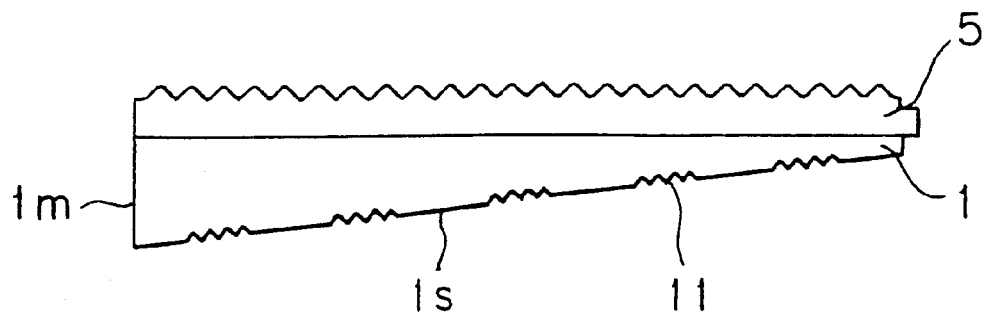
FIG. 3 is a view showing a third embodiment of a light guide plate of the present invention.

In a light guide plate 1 of the embodiment shown in FIG. 3, a lens film 5 is integrally formed on the light guide plate on its light-emerging-surface side. For the lens film 5, a resin film on which a large number of triangular or semi-ellipsoidal prisms are two-dimensionally arranged, or the like may be used.

To make the light guide plate as thin as 1.0 mm or less, and to provide a light-emerging pattern as needed are the same as in the first embodiment.

Figure 4:
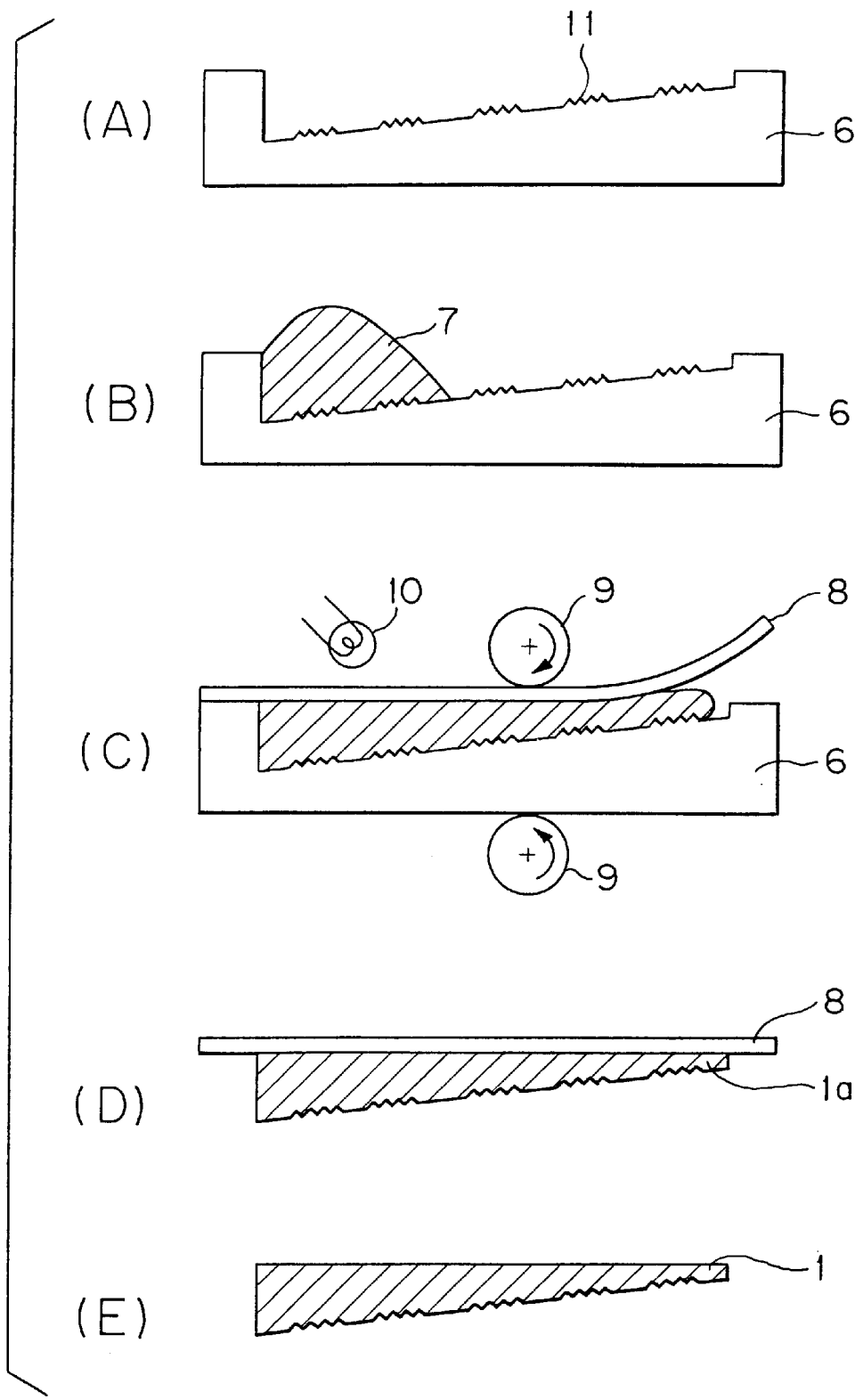
FIG. 4 is a view showing the steps of a process for producing a light guide plate according to the present invention.

FIG. 4 is a view showing the steps of a process for producing a light guide plate according to the present invention.

First of all, a mold 6 for shaping a light guide plate as shown in FIG. 4(A) is prepared. There is no particular limitation on the material for the mold as long as fine shapes can be reproduced by the mold. However, in order to use the mold repeatedly, the material is required to have durability. In general, a metallic material such as steel or stainless steel, which can be used for the injection molding of plastics, is preferred. This metallic material is made into a mold by means of intaglio, cutting, or the like. The light-emerging pattern 11 to be provided at the bottom of this mold is useful for scattering and reflecting light flux as mentioned previously, and may be provided by forming fine irregularities by a sandblast method or the like.

Next, as shown in FIG. 4(B), a liquid mass is formed by dropping an ionizing-radiation-curable resin 7 on one end of the mold. It is preferable that the ionizing-radiation-curable resin be dropped in a proper amount by weighing the resin in advance, by a flow coat method, a coating method using a dispenser, or the like. After the liquid mass is formed, an ionizing-radiation-transmissive resin film 8 that is large enough to cover the mold is placed on the mold from the part of the liquid mass. This film is spread by rolling press rollers 9 on both surfaces (or only on the top surface) of the mold, thereby covering the surface of the mold with the film, and, at the same time, filling the mold with the resin. Simultaneously with the movement of the press rollers 9, or after the film has been spread, the resin is cured by applying thereto ionizing radiation by the use of an ultraviolet light source 10 or the like (FIG. 4(C)). Since the curable resin layer is thin, it is not necessary to make the dose of radiation excessively large. In the case where the ionizing-radiation-curable resin is an electron-beam-curable resin, electron beams are applied.

After the ionizing-radiation-curable resin has been cured, the molded product 1a cured is removed from the mold 6 (FIG. 4(D)). At this time, the ionizing-radiation-transmissive film 8 is in the sate of being attached to the molded product. The film 8 is then cut according to the size of the light guide plate. The case where this film is used as the light-diffusive film 4 is equivalent to the second embodiment of a light guide plate of the present invention; and the case where the film is used as the lens film 5 corresponds to the third embodiment of a light guide plate of the present invention. If the film 8 is separated from the molded product cured, a light guide plate of the first embodiment of the present invention is obtained (FIG. 4(E)).

In the case where a light-reflecting layer is formed on the light-emerging-pattern-forming surface of the light guide plate, there may be employed such a method as (1) a method in which a white layer containing a pigment excellent in hiding power and whiteness, for instance, a powder of titanium dioxide, aluminum or the like, dispersed in the layer is formed by means of coating, screen printing, or the like, or (2) a method in which a metallic thin film is formed on the surface of the light-emerging pattern by means of metal plating, deposition or the like.

FIG. 6 is a view showing one example of a surface light source equipment of the present invention; and FIG. 7 is a perspective view showing the disintegrated components of the surface light source equipment shown in FIG. 6.

The surface light source equipment of the present invention shown in FIG. 6 employs the light guide plate 1 according to the first embodiment of the present invention, and a linear light source 2 is fixed at one end of this light guide plate. In the case where a light-emerging pattern is provided on the light guide plate 1, it is preferable to print white dots so that they will agree with the light-emerging pattern. By this, it is possible to promote the reflection of light at the part of the light-emerging pattern. In order to make the reflection of light uniform, the light-emerging pattern is generally so formed that the dots of the pattern are denser on the side far from the light source. On the light-emerging-surface side of the light guide plate, a light-diffusive film 4 and a lens film 5 are laminated, as needed.

FIG. 6 shows an example of the surface light source equipment using the light guide plate according to the first embodiment of the present invention. However, it is, of course, possible to use the light guide plate according to the second embodiment of the present invention in which a light-diffusive film is integrally formed on the light guide plate, or the light guide plate according to the third embodiment of the present invention in which a lens film is integrally formed on the light guide plate. In these cases, a surface light source equipment can be formed without laminating the light-diffusive film 4 and/or lens film 5 as shown in FIG. 6.

As shown in FIG. 7, a thin linear cold cathode light source is used as the light source 2, and a light reflector 21 and a light cover 22 are provided. In the case where the light guide plate is made into the shape of a plane, a dual-light-type equipment can be obtained by providing linear light sources on both sides of the light guide plate.

When the aforementioned surface light source equipment is placed on the back surface of a conventional rear projection liquid crystal display element, the resultant can be used as a liquid crystal display. Further, the surface light source equipment of the invention can be applied not only to rear projection liquid crystal displays but also to electrochromic displays, etc. which require back light sources.

Major materials that are used in the present invention will now be described.

[Ionizing-Radiation-Curable Resin]

Ultraviolet-light- or electron-beam-curable resins, etc. may be used as the ionizing-radiation-curable resin; and those compositions obtained by properly blending reactive prepolymers, oligomers and/or monomers containing polymerizable unsaturated bond or epoxy group in their molecules may be used.

Examples of these prepolymers and oligomers include urethane acrylates, polyester acrylates, epoxy acrylates, and unsaturated polyesters which are condensation products between siloxanes or unsaturated dicarboxylic acids and polyvalent alcohols, as well as acrylates such as alkyl acrylates, alkyl methacrylates, polyester acrylates, polyester methacrylates, polyether acrylates, polyether methacrylates, polyol acrylates, polyol methacrylates, melamine acrylate and melamine methacrylate.

Examples of monomers useful herein include vinylbenzene monomers such as styrene and α-methylstyrene, methyl acrylate, methyl methacrylate, ethyl acrylate, ethyl methacrylate, butyl acrylate, butyl methacrylate, 2-ethylhexyl acrylate, 2-ethylhexyl methacrylate, methoxyethyl acrylate, methoxyethyl methacrylate, butoxyethyl acrylate, butoxyethyl methacrylate, phenyl acrylate and phenyl methacrylate, as well as esters of unsaturated carboxylic acids and amino alcohols such as N-dimethylaminoethyl acrylate, N-dimethylaminoethyl methacrylate, N-diethylaminoethyl acrylate, N-diethylaminoethyl methacrylate, N-dibenzylaminoethyl acrylate, N-dibenzylaminoethyl methacrylate, N-diethylaminopropyl acrylate and N-diethylaminopropyl methacrylate.

Further, the monomers include unsaturated carboxylic acid amides such as acrylamide and methacrylamide; and esters of unsaturated carboxylic acids and glycols, such as ethylene glycol diacrylate, ethylene glycol dimethacrylate, propylene glycol diacrylate, propylene glycol dimethacrylate, neopentyl glycol diacrylate, neopentyl glycol dimethacrylate, propylene glycol diacrylate, propylene glycol dimethacrylate, 1,6-hexane diol acrylate, 1,6-hexane diol methacrylate, triethylene glycol diacrylate and triethylene glycol dimethacrylate.

Furthermore, the monomers also include polyfunctional compounds such as dipropylene glycol diacrylate, dipropylene glycol dimethacrylate, ethylene glycol diacrylate, ethylene glycol dimethacrylate, propylene glycol diacrylate and propylene glycol dimethacrylate; and polythiol compounds having two or more thiol groups in one molecule, such as trimethylol propane trithioglycolate, trimethylol propane trithiopropylate and pentaerythritol tetrathioglycolate.

The above-enumerated compounds are used either singly or as a mixture of two or more members, as needed. In order to give retention time to a resin composition between the application and curing thereof, it is preferable to make the proportion of the above-described prepolymers oroligomers 5% by weight or more, and that of the above-described monomers and/or polythiols 95% by weight or less.

In the case where the ionizing-radiation-curable resin is cured by the application of ultraviolet light, a photopolymerization initiator is incorporated into the ionizing-radiation-curable resin composition.

For the photopolymerization initiator, there may be used any mixture of acetophenones, benzophenones, Michler's benzoylbenzoate, methyl o-benzoyl-benzoate, aldoxime, tetramethylthiuram monosulfide, thioxantone, and/or photosensitizers such as n-butylamine, triethylamine and tributylphosphine.

In the case where the ionizing-radiation-curable resin is cured by the application of electron beams, the resin is preferably formed of photopolymerizable monomers or oligomers from which free radicals are liberated upon the application of electron beams with an energy of 100 to $10^6$ KeV.

[Ionizing-Radiation-Transmissive Resin Film]

Any of the following releasing films, light-diffusive films and lens films can be used as the ionizing-radiation-transmissive resin film.

Releasing Films

It is necessary to use, as the releasing films, by selecting those materials that do not exhibit stickiness or adhesiveness to resin layers that have been cured by the application of ionizing radiation, generally those materials that have low surface tensions. Specifically, preferred materials are polyethylene, polypropylene, polyvinyl fluoride, polyvinylidene fluoride, polyethylene tetrafluoride, polyethylene trifluoride, silicone rubbers, silicone polymers and the like. Films of these materials are transparent to ultraviolet light, so that they bring about no troubles except such a case where they contain ultraviolet light absorbers or the like.

Further, the releasing films may be releasant-treated films having low degrees of thermal shrinkage. It is possible to use, as the releasant-treated films, those films on which polyethylene tetrafluoride, polyethylene trifluoride, dimethylsilicone, phenyl-modified silicone, epoxy-modified silicone, or the like has been coated as a thin film of 1 to 10 μm.

Light-Diffusive Films

Light-diffusive films can be obtained by imparting light-diffusing properties to polyester or polycarbonate films having thicknesses of 50 to 200 μm by coating thereto light-diffusing inks, or the like, and those ones whose coefficients of thermal expansion are close to those of the resin used for forming the light guide plate are preferred. The following manner may also be adopted: an ultraviolet-light-curable adhesive agent is coated, in advance, onto the surface of this light-diffusive film with which the light guide plate is adhered, and cured simultaneously with the curing of the ultraviolet-light-curable resin.

Lens Films

Lens films are films on which a large number of minute triangular or semi-ellipsoidal prisms are two-dimensionally arranged in a plane so that the long sides of the prisms will be parallel with each other, and serve to condense light rays from the surface light source or light-diffusive film so that they can fall within a desired range of angles in the vicinity of the normal which is the direction of viewing the display. In general, a lens film is produced by such a method as a known thermal press method, or a method in which, after embossing an ultraviolet-curable thermoplastic resin film by the use of an embossing roll, the resin is cured by applying thereto ultraviolet light.

By referring now to FIGS. 4 and 6, an example of the present invention will be described hereinafter.

(Production of Light Guide Plate)

A mold 6 with an inclined recess was prepared by mechanically polishing a steel material (SUS type "prehardened steel") useful for a metal mold for molding plastics, having a thickness of 10 mm so that the resulting light guide plate would have a size of 220 mm×168 mm, a thickness on the light source side of 0.5 mm, and a thickness on the side opposite to the light source side of 0.1 mm. The steel was allowed to remain just like a dike at the periphery of the recess in the mold so that the mold would be able to support and hold the surface of a press roll. In order to form a light-emerging pattern on the back surface (opposite to the light-emerging side) of the light guide plate, a light-emerging pattern 11 was formed at the bottom of the mold by providing fine irregularities (sand grain finish) with a center line average height of 10 $\mu$m by a sandblast method using a resist (FIG. 4 (A)).

The viscosity of an epoxyacrylic ultraviolet-light-curable resin ("2900 2A" manufactured by Japan Synthetic Rubber Co., Ltd., Japan) [refractive index after being cured: 1.57] was adjusted to 1,500 cps. This resin 7 was dropped in an amount of approximately 12 cm$^3$ on a part at the thick side of the mold by a flow coating method to form a resin mass (FIG. 4(B)).

Subsequently, a 100 m thick polyethylene terephthalate film ("A4100" manufactured by Toyobo Co., Ltd., Japan) was placed as the ultraviolet-light-transmissive resin film 8 on the above resin. Thereafter, pressure was applied by rolling, at a rate of 50 cm/min, press rolls 9 between which the mold was being held, thereby filling the mold with the ultraviolet-light-curable resin (FIG. 4(C)). 160 W/cm of ultraviolet light was then applied to the back surface of the mold by the use of an ultraviolet light source, thereby curing the ultraviolet-light-curable resin 7. The molded product 1a which had been cured was released from the mold 6 to obtain a light guide plate with the film (FIG. 4(D)). The ultraviolet-light-transmissive film 8 was then separated from the molded product to finally obtain a light guide plate 1 (FIG. 4(E)).

This light guide plate was accurately formed to have a thickness on the light source side of 0.5 mm and a thickness on the side opposite to the light source side of 0.1 mm. It was approximately 1.5 mm thinner than conventional injection-molded light guide plates.

A reflective layer was formed on the light-emerging-pattern-forming part of the light guide plate by a screen printing method using a white ink.

(Production of Surface Light Source Equipment)

By placing a light-reflecting film 3 on the back surface of this light guide plate, and laminating a light-diffusing film 4 and a lens film 5 to the light guide plate on its light-emerging-surface side, a surface light source equipment was obtained.

(Production of Liquid Crystal Display)

By placing the above-described surface light source equipment on the back surface of a rear projection liquid crystal display element, a liquid crystal display was finally obtained.

What is claimed is:

1. A light guide plate for use in the surface light source equipment of a liquid crystal display or the like, wherein the light guide plate is a molded product of an ionizing-radiation-curable resin, and its maximum thickness of the plate is 1.0 mm or less.

2. The light guide plate according to claim 1, wherein a light-diffusive film is integrally formed on the light guide plate on its light-emerging-surface side.

3. The light guide plate according to claim 1, wherein a film in the shape of a lens is integrally formed on the light guide plate on its light-emerging-surface side.

4. The light guide plate according to claim 1, wherein a light-emerging pattern is formed on the light guide plate on its light-flux-reflecting surface side.

5. A process for producing a light guide plate, comprising forming a resin mass of an ionizing-radiation-curable resin at one end of the inside of a mold for shaping a light guide plate; placing an ionizing-radiation-transmissive film on the resin mass of the ionizing-radiation-curable resin; spreading the film on the ionizing-radiation-curable resin while filling the mold with the ionizing-radiation-curable resin through the film by the use of press rolls; curing the ionizing-radiation-curable resin by applying thereto ionizing radiation; and releasing the molded product of the ionizing-radiation-curable resin from the mold.

6. The process according to claim 5, further comprising separating the film from the molded product released.

7. The process according to claim 5, wherein the ionizing-radiation-transmissive film is a light-diffusive film.

8. The process according to claim 5, wherein the ionizing-radiation-transmissive film is in the shape of a lens.

9. The process according to claim 5, wherein the mold for shaping the light guide plate is provided with a light-emerging pattern.

10. A surface light source equipment comprising a light guide plate according to claim 1, in which a light-diffusive film and/or lens-shaped film is laminated to the light guide plate on its light-emerging-surface side, and a linear light source provided adjacent to one or both side surfaces of the light guide plate.

11. A liquid crystal display comprising a rear projection liquid crystal display element, and a surface light source according to claim 10, provided on the back surface of the liquid crystal display element.

* * * * *